Figure 5:
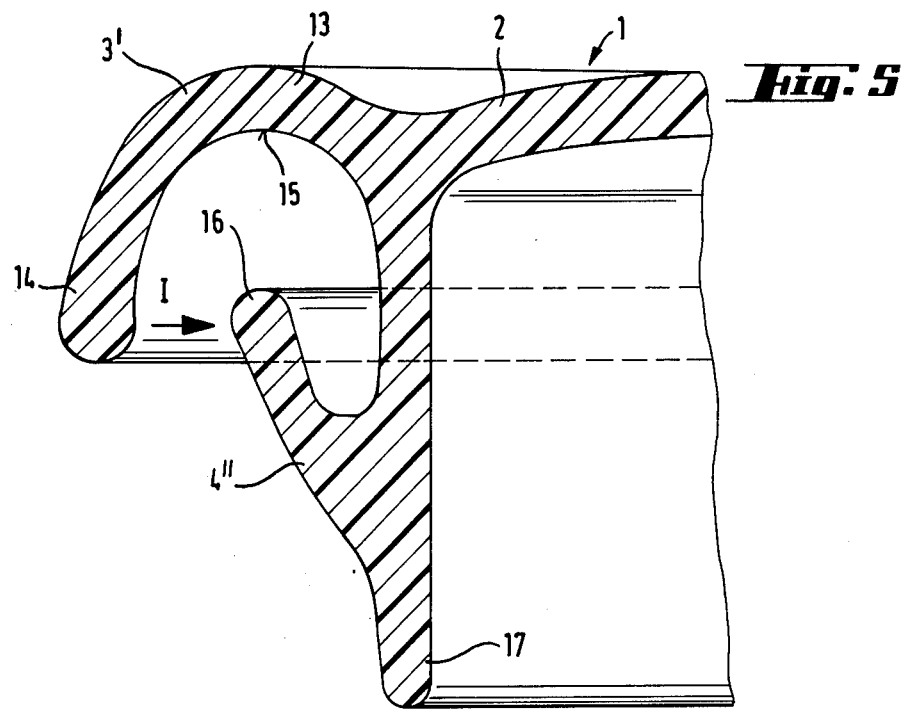

United States Patent [19]

van den Beld et al.

[11] Patent Number: 4,760,935
[45] Date of Patent: Aug. 2, 1988

[54] PLASTIC CLOSURE PLUG

[76] Inventors: Paul Christiaan H. van den Beld, Bakenbergseweg 104, NL-6814 ML Arnhem, Netherlands; Gerhard Kettenring, Ringstrasse 4, D-6751 Schopp, Fed. Rep. of Germany; Bodo Greulich, Keltenweg 76, D-6750 Kaiserlautern, Fed. Rep. of Germany; Gunther Schmitz, Quellenstrasse 8, Enkenbach-Alsenborn 2, Fed. Rep. of Germany

[21] Appl. No.: 916,544
[22] PCT Filed: Dec. 18, 1985
[86] PCT No.: PCT/DE85/00530
  § 371 Date: Aug. 15, 1986
  § 102(e) Date: Aug. 15, 1986
[87] PCT Pub. No.: WO86/03721
  PCT Pub. Date: Jul. 3, 1986

[30] Foreign Application Priority Data

Dec. 18, 1984 [DE] Fed. Rep. of Germany ....... 3446151

[51] Int. Cl.[4] ............................................. B65D 39/06
[52] U.S. Cl. ............................. 220/307; 220/DIG. 19
[58] Field of Search ....................... 220/307, DIG. 19

[56] References Cited

U.S. PATENT DOCUMENTS

| 3,814,279 | 6/1974 | Rayzal ...................... 220/DIG. 19 |
| 4,334,632 | 6/1982 | Watanabe ............................. 220/307 |
| 4,401,225 | 8/1983 | Schwaikert ......................... 220/307 |
| 4,646,932 | 3/1987 | Mosler ................................. 220/307 |

Primary Examiner—George T. Hall
Attorney, Agent, or Firm—Fay, Sharpe, Beall, Fagan, Minnich & McKee

[57] ABSTRACT

The invention relates to a plastics closure member, more particularly for closing an opening in motor vehicle bodywork, the closure member having a main member 2, a sealing lip 3 and, disposed opposite the same, a catch ring 4. According to the invention, the closure member is made of a polyester-ester-urethane, the main member 2 merging directly into the sealing lip 3 and the catch ring 4.

7 Claims, 2 Drawing Sheets

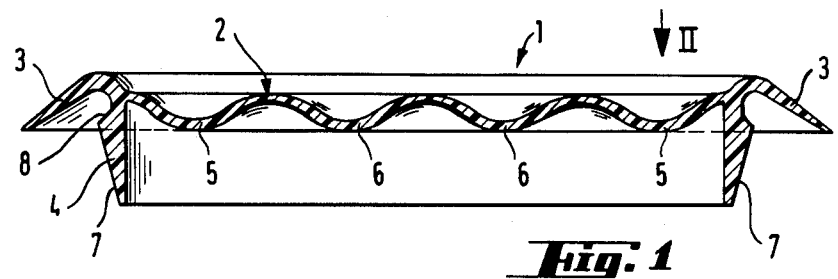
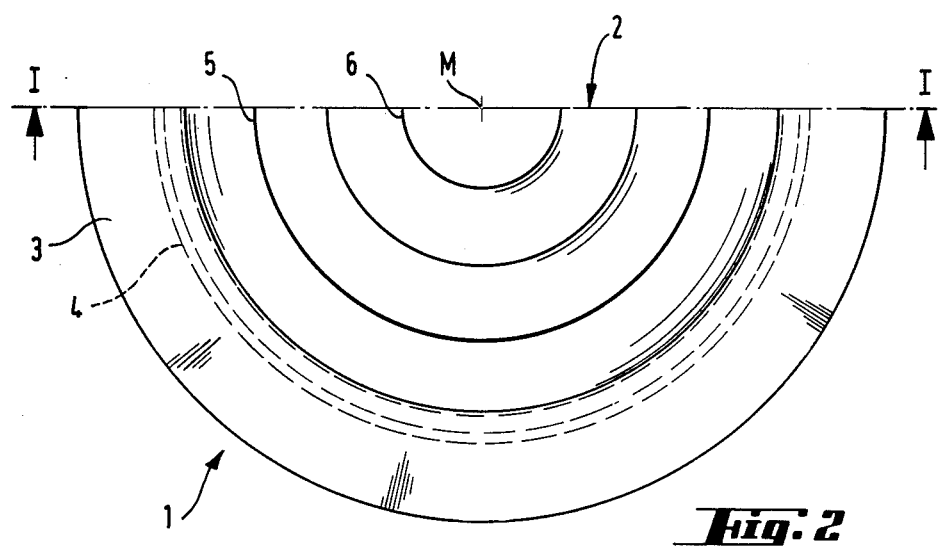
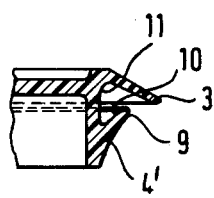
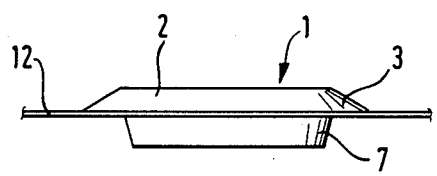

PLASTIC CLOSURE PLUG

The invention relates to a plastics closure member, more particularly for closing an opening in motor vehicle bodywork. The closure member may have a main body portion, a sealing lip and, disposed opposite the same, retaining means.

In a prior art closure member of this kind, the main body portion is drawn in after the fashion of a U so that a peripheral groove is left in the top of the closure member (DE-PS No. 1 555 007). Production and material costs are therefore considerable, nor can the closure member always be guaranteed to provide satisfactory sealing of the opening in motor vehicle bodywork. However, water-tight closure or sealing of openings in motor vehicle bodywork is precisely what is needed to prevent damage occurring, even after heat treatment, should the vehicle be repainted.

The prior art also includes a closure plug for drain holes in motor vehicle floors, again with a U-shaped main zone, the same co-operating with the opening in the bodywork to form a kind of snap fastening (DE-GM No. 1 840 793). This known construction too is expensive and cannot guarantee satisfactory sealing of openings in motor vehicle bodywork.

However, it is the object of this invention to provide a closure member of the kind hereinbefore set out and capable of providing simple, economic and satisfactory sealing, more particularly of an opening in motor vehicle bodywork, and which will withstand heavy loads.

According to the invention we provide a plastics closure member for closing an aperture in a panel, the closure member having a main body portion, a sealing lip and means for retaining the closure in the panel aperture, characterised in that the closure member is unitary so that the main body portion merges directly into the sealing lip and the retaining means.

The closure member may be made from polyester-ester-urethane. This feature provides the following advantages:

Ability to withstand temperatures in a range from −40° to more than 170° C.;
Waterproof characteristic after heat stressing;
Ready assembly;
Good paintability—i.e., no substantial alterations caused by industrial paints;
Resistance to greases, oils and other grease products;
Resistance to UV light;
Abrasion and wear resistance;
Resilience as a function of temperature;
Chemical resistance.

The special construction of the closure member also ensures a satisfactory sealing closure of an opening, more particularly in motor vehicle bodywork.

According to another feature of the invention, the main body portion can be corrugated; in this case the corrugations can extend concentrically. The corrugations are an advantageous way of ensuring satisfactory compensation for tolerances in respect of temperature-induced shrinkage.

According to another feature of the invention, the sealing lip, which may be contiguous with the outermost corrugation of the main body portion, can be thin-walled and taper conically. This conical thin-walled sealing lip provides satisfactory sealing-tightness in respect of water and compensation for differences in metal thickness, unevennesses in the metal being taken up. In this event the sealing lip can have a bead to improve engagement with a metal panel.

According to another feature of the invention, the retaining means may comprise a peripheral retaining ring disposed opposite the thin-walled sealing lip and having walls disposed at an obtuse angle to one another. The walls co-operate with the resilient sealing lip to ensure that the closure member according to the invention is so secured satisfactorily to the metal of motor vehicle bodywork or of some other support as to provide a watertight connection.

According to another feature of the invention, the retaining means may comprise an annular lip defined by walls disposed at an actute angle to one another. This feature too helps to provide a watertight connection between the closure member according to the invention and the support or carrier member—i.e., for example, motor vehicle bodywork.

The sealing lip can have a roughened region on the underside thereof near the main body portion; the roughened region enhances the tightness of fit in the opening after temperature-induced effects.

According to another feature of the invention, the sealing lip can have a front peripheral bead. Also, the corrugations in the main body portion can have alternately different material thicknesses.

According to another feature of the invention, the sealing lip can be droplet-shaped and merge by way of a curved zone into the main body portion. Also, the droplet shape can be designed so as, in use, to be near the bodywork of a vehicle; in this event the retaining ring is directed towards the underside of the curved zone and has a dropletshaped front end. With the sealing lip and retaining ring thus devised, in each case in droplet shape in the front part, the weight distribution of both elements is such that in the material-specific shrinkage occurring in response to heat, the sealing lip is drawn inwards and engagement of the retaining ring with the underside of the bodywork is also enhanced, with the overall result of an increase in the sealing force. The material accumulation therefore draws the sealing lip and the retaining ring towards the bodywork surfaces which are opposite one another.

According to another feature of the invention, the retaining means can merge into a cylindrical extension, so that more particularly in the case of automatic or assembly line production, an aid to entry is provided in a simple manner. Since in motor vehicle manufacture the bodywork concerned is often moving on an assembly line during assembly, accurate positioning of the particular hole concerned in the bodywork is difficult and the cylindrical extension is a simple means of aiding assembly.

According to another feature of the invention, the cylindrical extension can have a corrugated edge or be formed with recesses extending parallel to its axis. This feature helps to economize on material.

Figure 6:
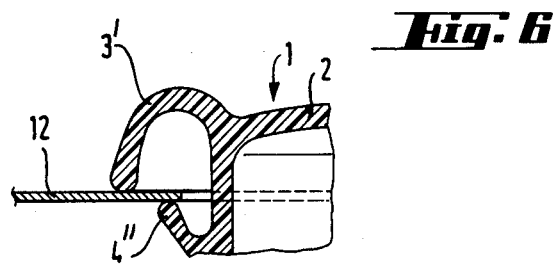
Figure 7:
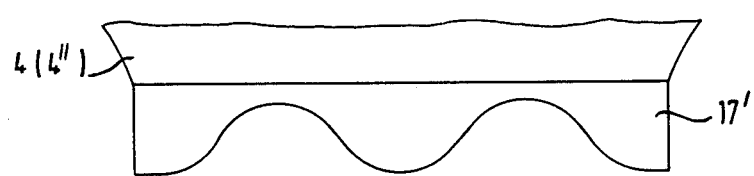

The invention will be described hereinafter in greater detail with reference to embodiments illustrated in the drawings wherein:

FIG. 1 is a cross-section through a closure member;
FIG. 2 is a plan view of part of the closure member;
FIG. 3 shows the closure member fitted in motor vehicle bodywork;
FIG. 4 is a view in section and partly broken away of another embodiment of the closure member;
FIG. 5 is a view in section and partly broken away of another embodiment of the closure member;

FIG. 6 is a view in section and partly broken away of the embodiment of FIG. 5 when assembled, and FIG. 7 is a developed view of the bottom zone of the closure member according to the invention.

FIG. 1 shows a closure member 1 made of polyester-ester-urethane (in accordance with European patent application No. 83 20 1150.6, published under No. 102115). Member 1 has a main body portion 2, a peripheral sealing lip 3 and, disposed opposite the same, a peripheral retaining ring 4.

In the embodiment shown in FIG. 1 and 2, the retaining ring 4 is wedge-shaped and has two walls 7, 8 which extend at an obtuse angle to one another.

The lip 3 is thin-walled and has a conical taper. The lip 3 merges into the main body portion 2, the same being corrugated, possibly with corrugations 5, 6 which extend concentrically of a centre line M.

The outermost corrugation 5 merges directly into the retaining ring 4 and the lip 3. The lip 3, ring 4 and main body portion 2 are of unitary construction.

The lip 3 is sufficiently flexible to engage firmly with the support member, such as vehicle bodywork 12, after having been pressed into a bore in such member, as can be seen in FIG. 3. Pressing into the corresponding opening is facilitated by the thinness of the lip 3.

The special construction of the retaining ring 4 with its two walls 7,8 ensures that the closure member 1 clamps the bodywork 12 satisfactorily, as shown in FIG. 3. A satisfactory waterproof connection and a clean closure of the opening in the bodywork 12 is therefore provided by means of the closure member 1.

The effect of the corrugations 5, 6 shown in FIGS. 1 and 2 is that material shrinkage of the closure member 1 after heat treatment of the bodywork 12 is insubstantial. The closure member 1 therefore provides a watertight closure without fusion being necessary as has been conventional. Since this conventional fusion can be obviated, the closure member 1 can be fitted after the vehicle has been painted. However, the closure member 1 remains waterproof even after heat treatment at high temperatures and is thus certain to remain operative even should the vehicle be repainted.

In the embodiment shown in FIG. 4 the retaining ring 4' comprises a resilient lip defined by two walls 9, 10 disposed at an acute angle to one another. The ring 4' is resilient and, in co-operation with the thin-walled resilient sealing lip 3 ensures watertight closure of an opening in a support or carrier member. Also, a region of roughness can be provided to enhance the tightness of fit in the opening in the metal—i.e., in the support member—after heating.

As shown in FIG. 1, the corrugations 5, 6 can have different thicknesses of material from one another to enhance flexibility.

In the embodiment shown in FIG. 5 the sealing lip 3' is droplet-shaped and merges by way of a curved zone 13 into the main body portion 2. The same can in this case be corrugated with the corrugations 5, 6; however, the corrugated feature can be omitted. The droplet shape 14 of the lip 3' is near the vehicle bodywork 12, as can be gathered from FIG. 6.

Because of the droplet shape 14 of the lip 3', the same responds to material-specific heat shrinkage by being drawn inwardly in FIG. 5, in the direction indicated by an arrow I, so that sealing tightness is enhanced. The weight distribution and the angle of the lip 3' and droplet shape 14 is such that this effect hereinbefore described occurs during shrinkage.

Referring to FIGS. 5 and 6, the retaining 4" can be directed towards the underside 15 of the curved zone 13 and also have at the front a droplet-shaped element. The effect of the same in the shrinkage process occurring in response to heating is to engage the ring 4 more firmly with the underside of the vehicle bodywork 12, as shown in FIG. 6. Consequently, because of their special construction the two elements 3' and 4" ensure very satisfactory sealing by the closure member according to the invention.

Referring to FIG. 5, the closure member can have a cylindrical extension 17 as an aid to entry in flow line assembly. The cylindrical aid 17 can also be provided in the constructions shown in FIGS. 1 and 4 below the ring 4, 4' respectively. To economize on material, FIG. 7 shows that the extension 17 can be corrugated to give a corrugated cylindrical extension 17'. This step saves material. The cylindrical extension 17', instead of being corrugated, can be formed with recesses parallel to the axis thereof.

We claim:

1. A plastic closure member for insertion into an opening formed in a panel for closing and sealing said opening comprising:
    a main body portion having a generally collar shaped side wall sized and adapted for insertion into the opening in the panel;
    a continuous peripheral sealing lip formed integrally with said main body portion and extending radially outwardly from adjacent a first end of said main body portion, said lip being flexible and having an end portion adapted to extend toward and engage said panel about said opening;
    a peripheral retaining ring formed integrally with said main body and extending radially outwardly of said main body at a location axially spaced from said sealing lip, said retaining ring having a continuous sealing edge lying radially inwardly of the end portion of said sealing lip and adapted to engage said panel circumferential about said opening on the side of said panel opposite said sealing lip;
    said main body portion further including a continuous endwall joined to said side wall at a level generally corresponding to said sealing lip, said end wall having at least one concentrically extending corrugation which is integrally joined with and merges directly into said sealing lip.

2. The closure member as defined in claim 1 wherein said closure member is formed of polyester-ester-urethane.

3. The closure member as defined in claim 1 wherein the sealing lip tapers toward said end portion.

4. The closure member as defined in claim 1 including a plurality of said corrugations with the corrugations having different material thicknesses.

5. The closure member as defined in claim 1 wherein the sealing lip has a peripheral bead portion.

6. The closure member as defined in claim 1 wherein the sealing lip is droplet-shaped in cross-section and merges by way of a curved zone into the main body portion.

7. The closure member as defined in claim 6 wherein the retaining means comprises a resilient lip extending toward said curved zone.

* * * * *